United States Patent [19]

Preston et al.

[11] Patent Number: 5,280,138
[45] Date of Patent: Jan. 18, 1994

[54] CABLE PROTECTOR

[75] Inventors: John Preston; Stephen B. Bogese, II, both of Roanoke, Va.

[73] Assignee: Virginia Plastics Company, Inc., Roanoke, Va.

[21] Appl. No.: 861,018

[22] Filed: Mar. 31, 1992

[51] Int. Cl.⁵ .......................... H01B 7/24; H01B 17/58
[52] U.S. Cl. .................. 174/152 G; 174/135; 174/136; 174/167; 16/2; 248/56
[58] Field of Search ............... 174/65 G 183, 152 G, 153 G, 151, 135, 136, 167; 16/2, 108, 109; 248/56

[56] References Cited

U.S. PATENT DOCUMENTS

| | | | |
|---|---|---|---|
| 1,158,105 | 10/1915 | Callender | 174/83 |
| 1,801,549 | 4/1931 | Frederickson | 174/83 |
| 1,829,512 | 10/1931 | Frederickson | 174/83 |
| 2,195,403 | 4/1940 | Bay | 174/83 X |
| 2,209,274 | 7/1940 | Jaberg | 174/83 |
| 2,258,745 | 10/1941 | Dewey et al. | 174/83 |
| 2,284,370 | 5/1942 | Carlson | 174/83 |
| 2,338,316 | 1/1944 | Buzzell | 174/83 |
| 3,580,988 | 5/1971 | Orlowski | 174/153 G |
| 4,144,616 | 3/1979 | Gould et al. | 174/153 G X |
| 4,202,457 | 5/1980 | Tansi | 220/3.3 |
| 4,295,691 | 10/1981 | Rubenthaler | 174/152 G X |
| 4,700,416 | 10/1987 | Johansson | 5/81.1 |
| 4,912,285 | 3/1990 | Falciglia | 174/83 |

OTHER PUBLICATIONS

The Virginia Plastics Company brochure ("Engineering Standards Guide: Leaderguard Cable Protector"), 1989.

Primary Examiner—Leo P. Picard
Assistant Examiner—Hyung S. Sough
Attorney, Agent, or Firm—Saidman Design Law Group

[57] ABSTRACT

A cable protector for insertion into the open end of a duct or conduit for preventing a cable pulled therethrough from being damaged by the edges of the duct or conduit. The cable protector has a substantially C-shaped cross-section and includes a turned-over lip which encapsulates the end of the duct and prevents the cable protector from being pulled into the duct or conduit. A groove at the juncture of the lip and a curved transitional portion facilitates folding of the cable protector to allow insertion thereof into a variety of sizes of ducts or conduits. Ribs located on the external surface of the body of the cable protector ensures a substantially tubular configuration of the protector after its diameter has been reduced to fit into the intended duct or conduit. The inside surface of the cable protector may be textured to minimize friction.

18 Claims, 12 Drawing Sheets

CABLE PROTECTOR

BACKGROUND OF THE INVENTION

1. Field of the Invention

This invention relates to devices for protecting cable as it is pulled through a duct or conduit.

2. Description of Related Art

In those instances where cable or wires must be run through a concrete, plastic or metal duct, or a conduit or pipe, a device commonly referred to as a cable protector is often placed at the open end of the duct or conduit for the purpose of protecting the integrity of the cable as it is pulled into the duct or conduit. Indeed, the rough edge of a duct or conduit can often damage the cable, rendering it inoperative or useless. Generally, these cable protectors have comprised a rounded split piece of semi-rigid, semi-flexible material (such as plastic) of a uniform thickness which is folded over to form a tubular-like shape capable of fitting into the open end of the duct or conduit. These cable protectors are equipped with a smooth flanged end whose purpose is to protect the cable or wires from having contact with the end of the duct or conduit as the cable is pulled therethrough. A typical prior art cable protector of this type is known as the "Leaderguard" brand (types 345, 800, 225 and 400) manufactured by Virginia Plastics Company, Inc. of Roanoke, Va.

A major difficulty with the cable protectors which are presently in use is that, as the cable protector is folded over for placement into the duct or conduit, the flanged end of the protector turns inwardly and upwardly. That is, the more the cable protector is folded over to create a smaller tubular configuration, the more the flanged end turns inwardly and upwardly. If folded over enough, the flanged end would disappear completely. This creates the likely possibility of the cable protector being pulled into and lost inside of the duct or conduit as wires or cable are pulled therethrough.

In addition, since the present cable protectors are designed to be of a uniform thickness throughout, a centerline is created as the cable protector is folded over for insertion into a duct or conduit. This centerline is naturally stressed more than the other areas of the cable protector on each side of the centerline. Thus, the cable protector may fracture along the centerline rendering the cable protector useless. The creation of the centerline fold also prevents the cable protector from having the substantially tubular configuration of the duct or conduit in which it is placed. Thus, the cable protector may encounter some difficulty in being inserted into the duct or conduit.

Further problems encountered with the cable protectors currently in use is that the smooth polished outside surface of the cable protector may be scratched or cut due to a sharp edge or burr. This creates a potential point of fracture, particularly in cold or dry conditions. Also, current cable protectors are provided with a smooth polished inside surface. This smooth surface can create additional surface friction as cable is drawn therethrough, potentially causing damage to some insulations on the cable.

OBJECTS AND SUMMARY OF THE INVENTION

It is therefore a primary objective of the present invention to provide a cable protector which will not be entirely pulled into a conduit or pipe as cable or wire is pulled therethrough.

Another object of the present invention is to provide a cable protector which has a more uniform circular fold or tubular configuration when inserted into a duct or conduit.

A still further object of the present invention is to provide a cable protector in which the problem of fractures in the smooth polished surface are reduced.

A still further objective of the present invention is to provide a cable protector which will decrease surface friction as cable or wire is fed or pulled across the cable protector.

The foregoing and other objects are achieved in accordance with one aspect of the present invention by use of a cable protector for insertion into a duct or conduit having an open end comprising a body portion, a lip portion, and a transitional portion between the body portion and the lip portion. The cable protector also includes an inside surface, an outside surface, and means for preventing the cable protector from being pulled entirely into the duct or conduit. The body portion of the cable protector has a curved configuration. The transitional portion extends outwardly in an arch formation between the body portion and the lip portion. The lip portion of the cable protector extends outwardly and downwardly from the transitional portion.

In accordance with another aspect of the present invention, the means for preventing the cable protector from being pulled into the duct or conduit comprises means for encapsulating the open end of the duct or conduit. The cable protector further comprises means for facilitating the flexing of the lip portion. The means for facilitating the flexing of the lip portion comprises groove means between the lip portion and the transitional portion on the outside surface of the cable protector.

In accordance with another aspect of the present invention, the lip portion preferably folds downwardly and inwardly upon insertion of the cable protector into a duct or conduit. The means for encapsulating the open end of the duct or conduit comprises the folded lip portion together with the transitional portion.

In accordance with still another aspect of the present invention, the cable protector may include an inside surface which is textured.

In accordance with yet another aspect of the present invention, there is provided a cable protector for insertion into a duct or conduit having an open end which includes a body portion having a curved outside surface and a lip portion. The body portion preferably has means for ensuring a substantially tubular configuration when the cable protector is placed in the duct or conduit.

In accordance with still another aspect of the present invention, the cable protector preferably further includes means for gripping tightly to the interior surface of the duct or conduit, which may be irregularly shaped. The means for ensuring a substantially tubular configuration preferably comprises rib means formed on the curved outside surface of the cable protector. The means for allowing the cable protector to grip tightly to the duct or conduit also may comprise the rib means formed on the curved outside surface of the cable protector. The rib means may comprise a plurality of elongated protrusions on the outside surface of the body portion.

In accordance with other aspects of the present invention, the rib means may comprise alternating thick wall portions and thin wall portions formed on the curved outer surface of the body portion. The thick and thin wall portions may be oriented either vertically or horizontally on the curved outer surface with respect to the longitudinal axis of the body portion. In one embodiment, the rib means may be, for example, V-shaped.

In yet another embodiment of the present invention, the rib means may comprise a plurality of bands of varying thickness positioned substantially horizontally on the curved outer surface. The bands may include a thickest band positioned closest to the lip portion and a thinnest band positioned farthest away from the lip portion. The bands are of preferably a progressively decreasing wall thickness from the thickest band to the thinnest band.

BRIEF DESCRIPTION OF THE DRAWINGS

Further aspects, features and advantages of the present invention will be more readily apparent as the same becomes understood when considered in conjunction with the following detailed description of the present invention viewed together with the accompanying drawings, in which.

DETAILED DESCRIPTION OF THE PREFERRED EMBODIMENTS

Figures 1, 2:
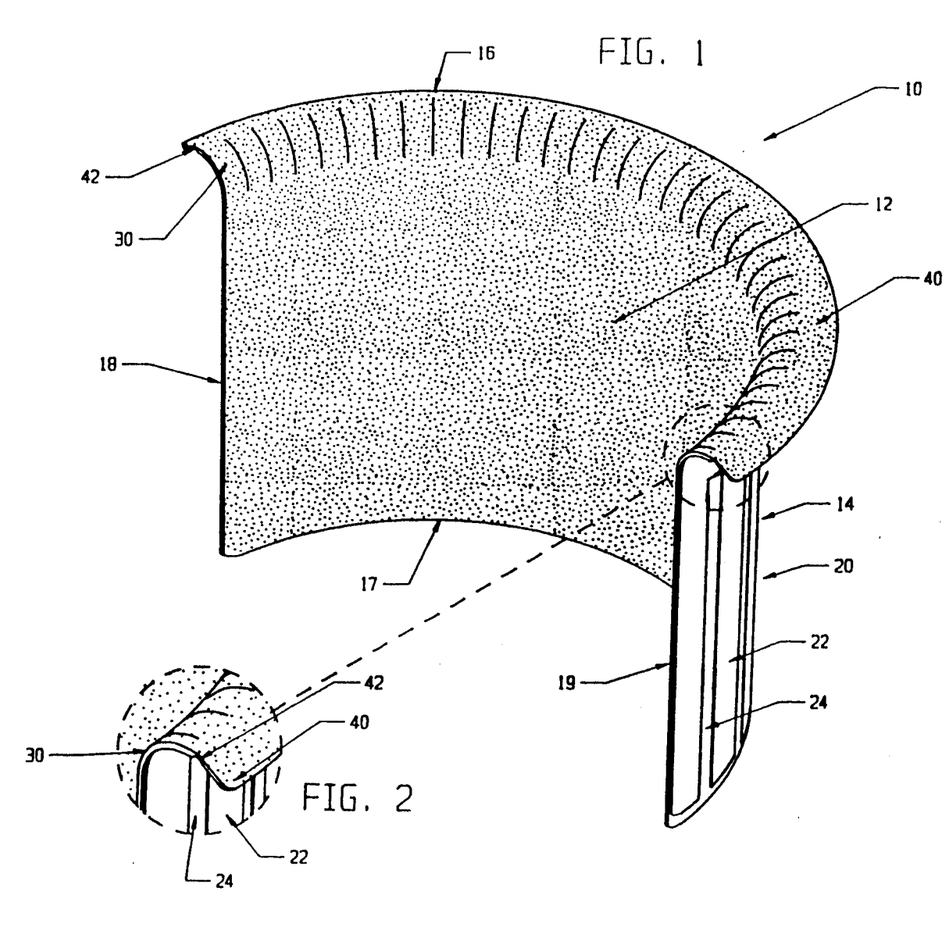
FIG. 1 is a perspective view of a preferred embodiment of the present invention.
FIG. 2 is a perspective view of a portion of the preferred embodiment of FIG. 1.

Referring now to the drawings, there is illustrated in FIG. 1 a perspective view of a cable protector 10 constructed in accordance with a preferred embodiment of the present invention. Cable protector 10 comprises a single piece of semi-rigid, semi-flexible material formed in a curved configuration, somewhat C-shaped in cross-section. The cable protector material may consist of a plastic such as polyamide, polypropylene, polyester, polyethylene, thermoplastic rubber, or even rubber. Cable protector 10 includes an inside surface 12 which is concave and an outside surface 14 which is convex. The outermost boundaries of cable protector 10 are generally defined by an upper edge 16, a lower edge 17, and two opposed lateral edges 18 and 19.

Figure 3:
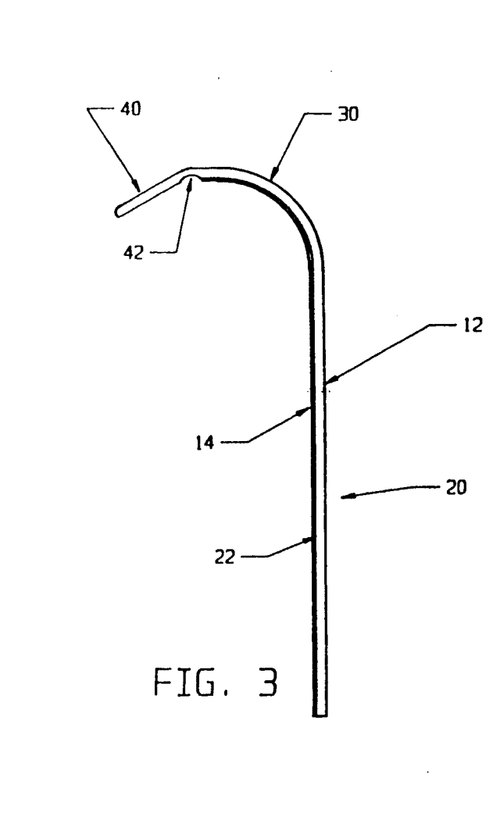
FIG. 3 is a longitudinal-sectional view of the preferred embodiment of FIG. 1.
Figure 8:
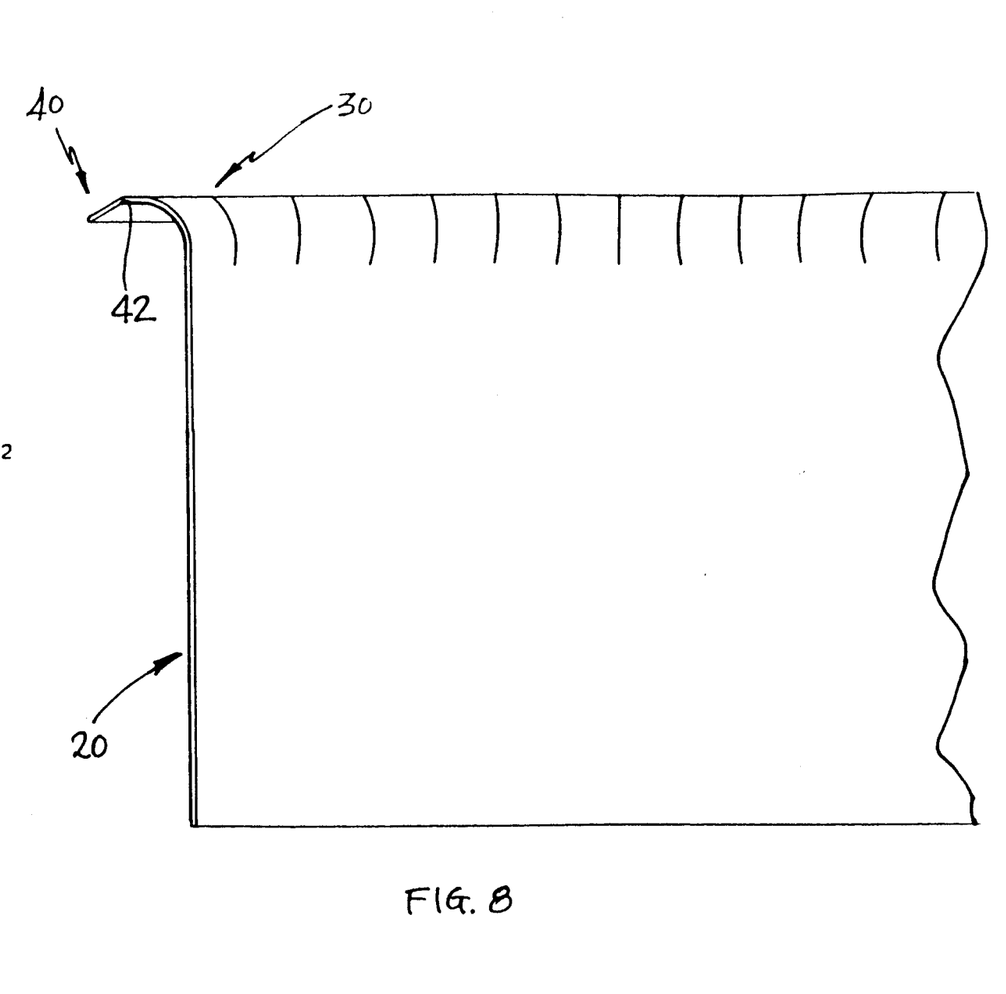
FIG. 8 is a front view in elevation of the preferred embodiment of FIG. 1.

Generally, with reference to FIGS. 1 and 8 which illustrate the invention in repose, prior to use, cable protector 10 comprises a curved, semi-cylindrical body portion 20. At the upper end of body portion 20, extending outwardly, away from the longitudinal axis of body portion 20, is a curved, arch-like transitional portion 30. In accordance with one aspect of the present invention, a substantially planar lip portion 40 extends outwardly and downwardly (as viewed in FIGS. 3 and 8) from transitional portion 30. A groove 42 is preferably formed between transitional portion 30 and lip portion 40 to facilitate flexing of the latter with respect to the former.

Figure 5:
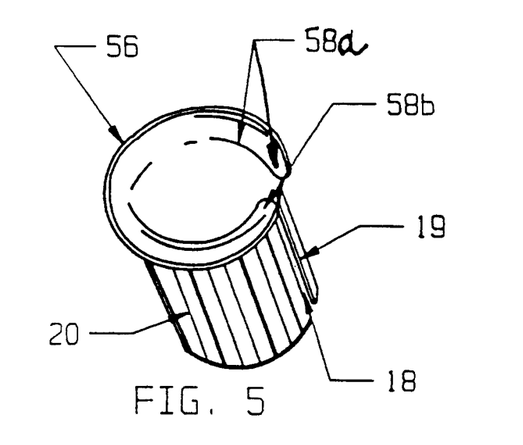
FIG. 5 is a perspective view of the embodiment of FIG. 1 after it has been folded just prior to insertion into a duct or conduit.

In order to place cable protector 10 into a duct or conduit, the cable protector is folded or curled over so that lateral edges 18 and 19 are brought towards each other, as illustrated in FIG. 5. By curling over cable protector 10 in this manner, a substantially tubular configuration is formed. Lateral edge 18 need not precisely meet lateral edge 19 when protector 10 is curled over. Rather, lateral edge 18 may be curled over and past lateral edge 19 so as to form a tubular structure which is small enough in diameter to fit within the desired duct or conduit.

Figure 4:
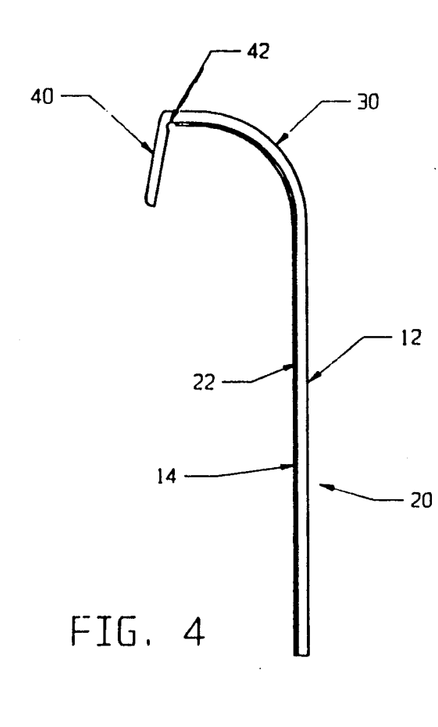
FIG. 4 is a longitudinal-sectional view of a preferred embodiment of the present invention after it has been curled over.
Figure 9:
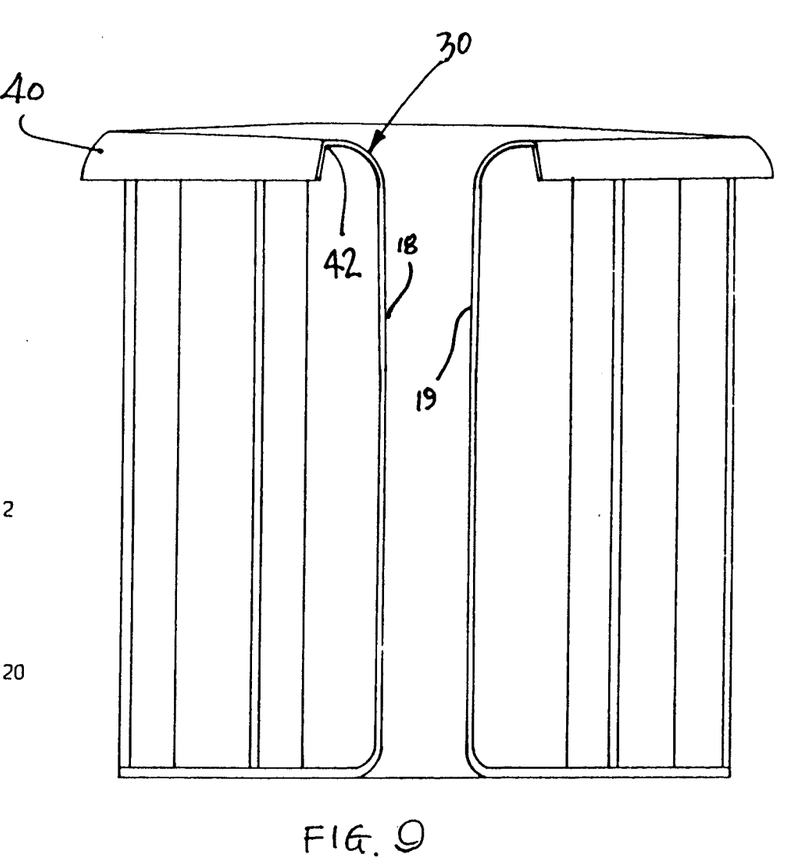
FIG. 9 is a front view in elevation of the embodiment of FIG. 4 showing the present invention in a folded condition.

Upon curling cable protector 10, lip portion 40 will fold downwardly and inwardly towards body portion 20 as shown in FIGS. 4 and 9, due to the placement of groove 42 between lip portion 40 and transitional portion 30. Generally, lip portion 40 will fold over to the greatest extent in the area of a midpath point 56 (see FIG. 5) of the protector. Also, at point 56 transitional portion 30 will extend in an upwardly ad inwardly direction relative to its position before protector 10 is curled. The folding over of lip portion 40 becomes less and less pronounced towards the peripheral edges 58a and 58b of cable protector 10.

Figure 6:
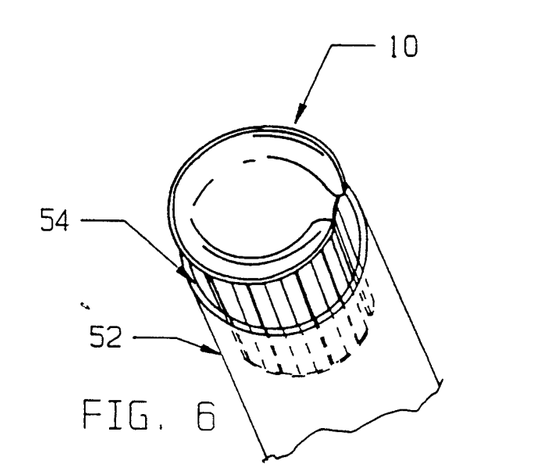
FIG. 6 is a perspective view of a preferred embodiment of the present invention as it is being inserted into a duct or conduit.
Figure 7:
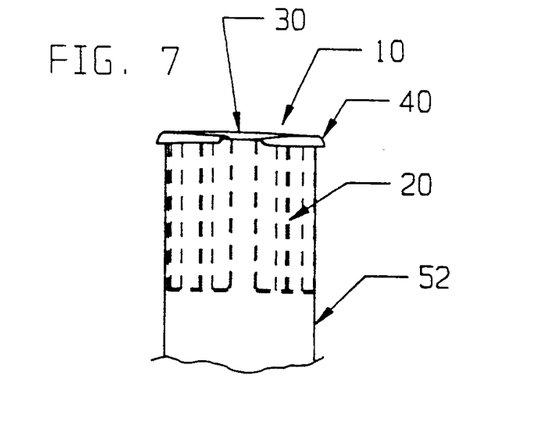
FIG. 7 is a side view of a preferred embodiment of the present invention after having been inserted into a duct or conduit.

As shown in FIGS. 6 and 7, upon insertion of cable protector 10 into a duct or conduit 52, folded lip portion 40 together with transitional portion 30 encapsulates an open end 54 of a duct or conduit 52. This prevents cable protector 10 from being pulled entirely into duct or conduit 52 as wires or cable are fed through the duct or conduit. Groove 42 may also act to stop cable protector 10 from being pulled into duct or conduit 52 by abutting open end 54 of the duct or conduit as cable protector 10 is pulled therein.

Referring once again to FIG. 1, outside surface 14 of body portion 20 may include a plurality of ribs 22 which preferably comprise alternating thick and thin wall portions extending from the area of lower edge 17 of protector 10 to transitional portion 30. Forming naturally between ribs 22 on outside surface 14 are channels 24. Ribs 22 comprise the thick wall portions, while channels 24 comprise the thin wall portions. In an alternate embodiment seen in FIG. 2, ribs 22 may be extended on outside surface 14 to terminate at groove 42.

The placement of ribs 22 on outside surface 14 of body portion 20 creates a more uniform circular or tubular configuration when cable protector 10 is curled to be inserted into duct or conduit 52. This not only allows cable protector 10 to fit more securely in duct or conduit 52, but also inhibits the creation of a stressed center line which could cause a fracture in the cable protector.

Inside surface 12 of cable protector 10 may be finished with a textured or stippled surface. This decreases the friction which is created by the pulling of cable wires over the cable protector, causing less damage to both the wires and the cable protector. It also decreases the likelihood that the interior surface will be fractured due to a sharp edge or burr.

Figure 10:
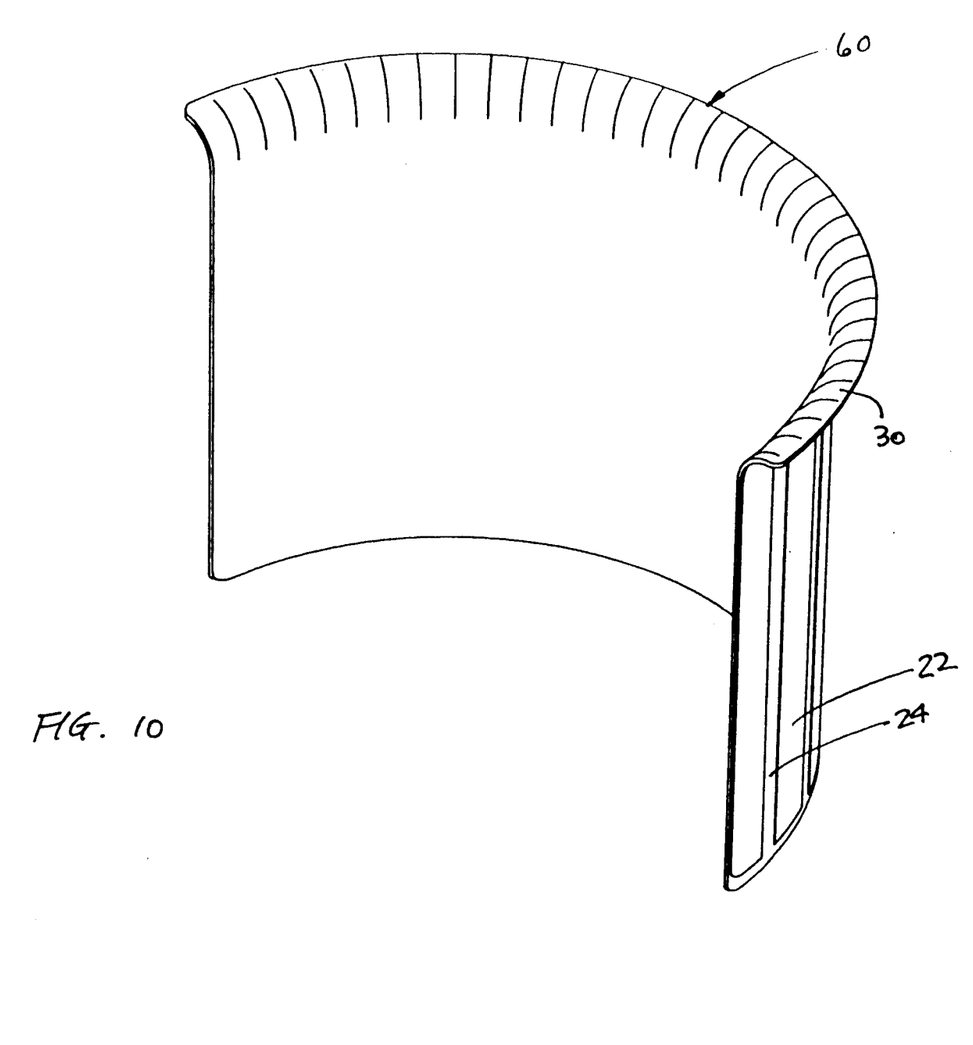
FIG. 10 is a perspective view of an alternate embodiment of the present invention.

Referring now to FIG. 10, there is illustrated an alternate embodiment of the present invention which comprises a cable protector without the inside surface texture or groove-lip features of the first embodiment described above. In the embodiment of FIG. 10, the upper edge 60 terminates transition portion 30 short of the area where a groove and lip would be formed. In this manner, the general shape of the cable protector of FIG. 10 is similar to that of the prior art Leaderguard described in the related art section of this application. The cable protector of FIG. 10 does, however, include ribs 22 and channels 24 which function as above-described to allow the product to flex more uniformly.

Figure 11:
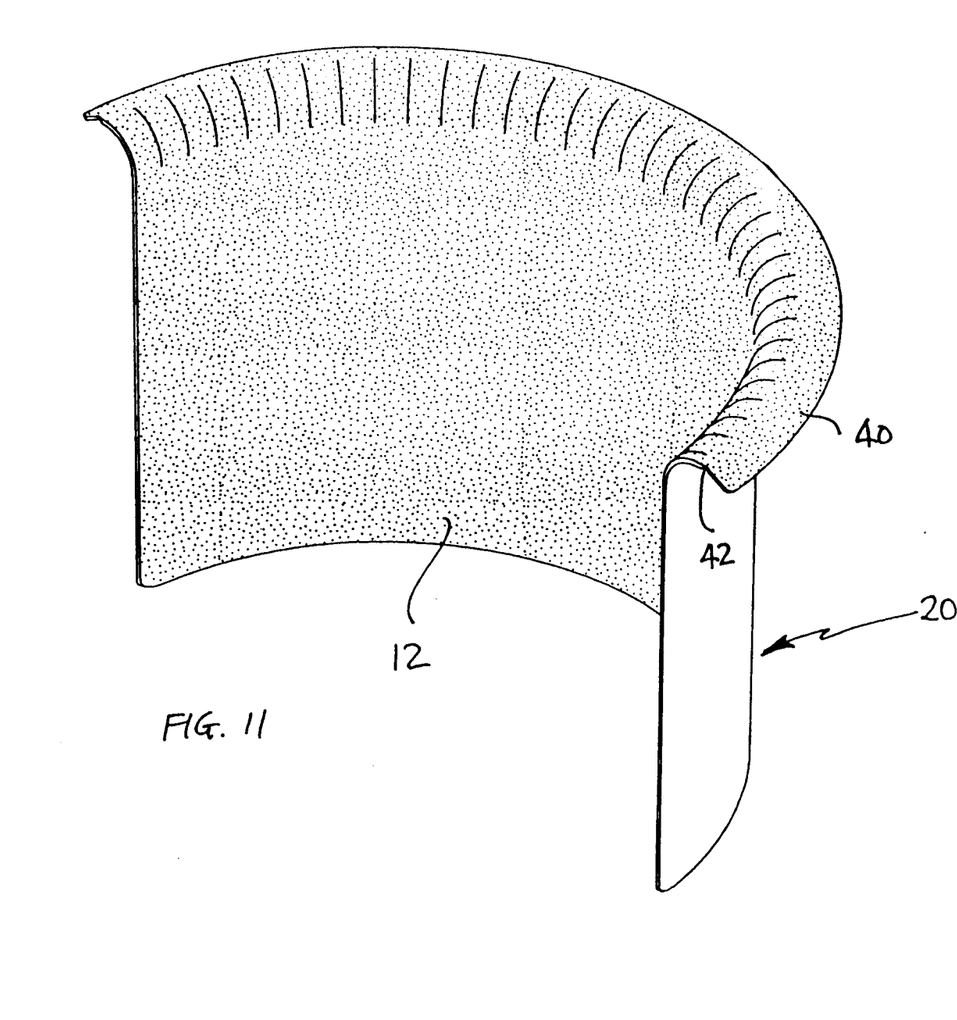
FIG. 11 is a perspective view of yet another alternate embodiment of the present invention.

Referring now to FIG. 11, there is illustrated yet another alternate embodiment of a cable protector which includes a groove 42 and fold-over lip portion 40, but does not have any rib-like structure on its outer surface 20. Inside surface 12 may be provided with texture 12 as desired.

Figure 12:
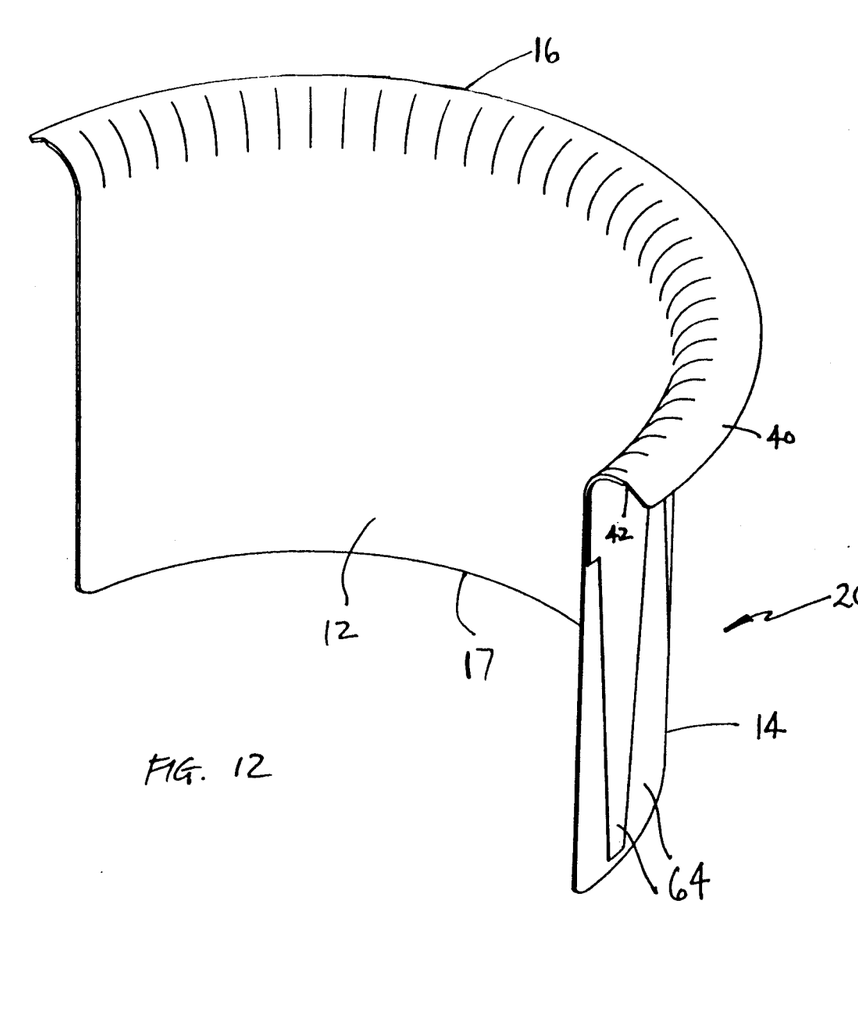
FIG. 12 is a perspective view of a still further alternate embodiment of the present invention.
Figure 13:
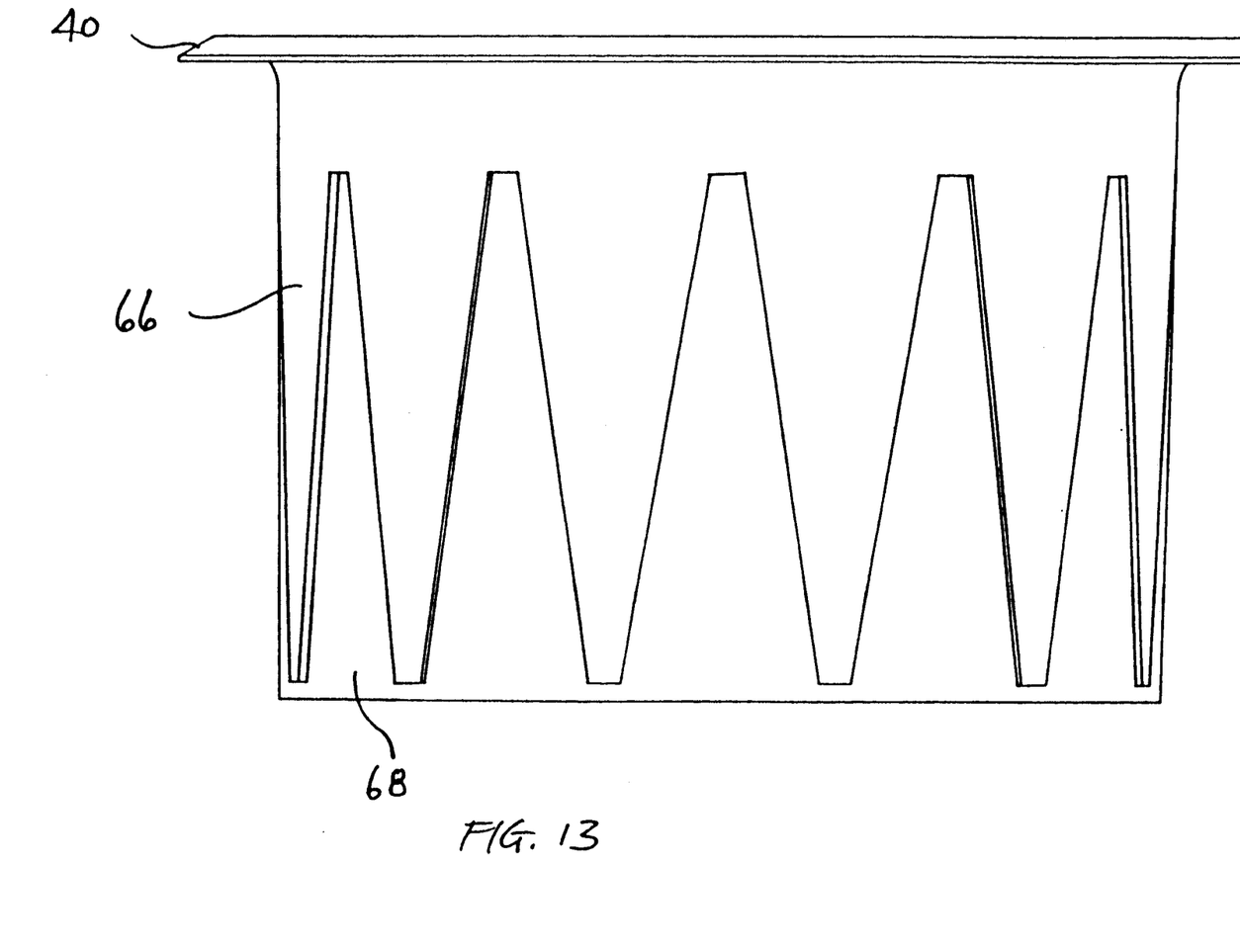
FIG. 13 is a side view in elevation of the preferred embodiment shown in FIG. 12.

FIGS. 12 and 13 show another embodiment of the present invention which uses a plain inside surface 12, a groove 42 and fold-over lip portion 40. Outside surface 14 has located thereon alternating V-shaped ribs indicated generally by reference numeral 64. V-shaped ribs 64 comprise relatively thick wall portions 66 and relatively thin wall portions 68. This variation in wall thickness allows the cable protector to flex more uniformly (there is greater flexibility near lower end 17 than upper end 16), and facilitates form-fitting of the protector to the interior of the piece of duct or conduit in which it is installed. The configuration of ribs 64 in this embodiment makes it clear than many different thick and thin rib configurations would suffice to perform the function of the present invention.

Figure 14:
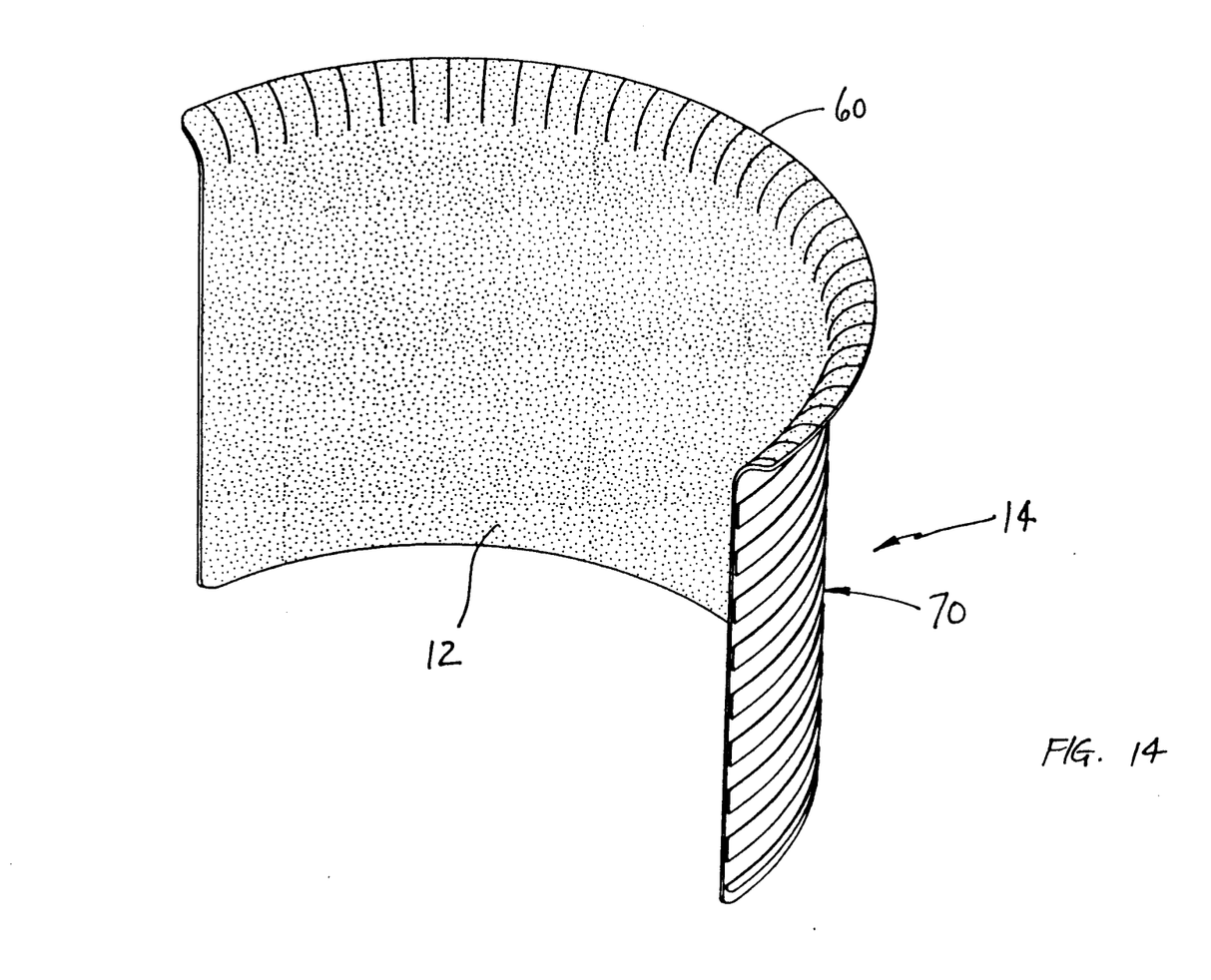
FIGS. 14 and 15 are perspective and side views of another embodiment of the present invention.
Figure 15:
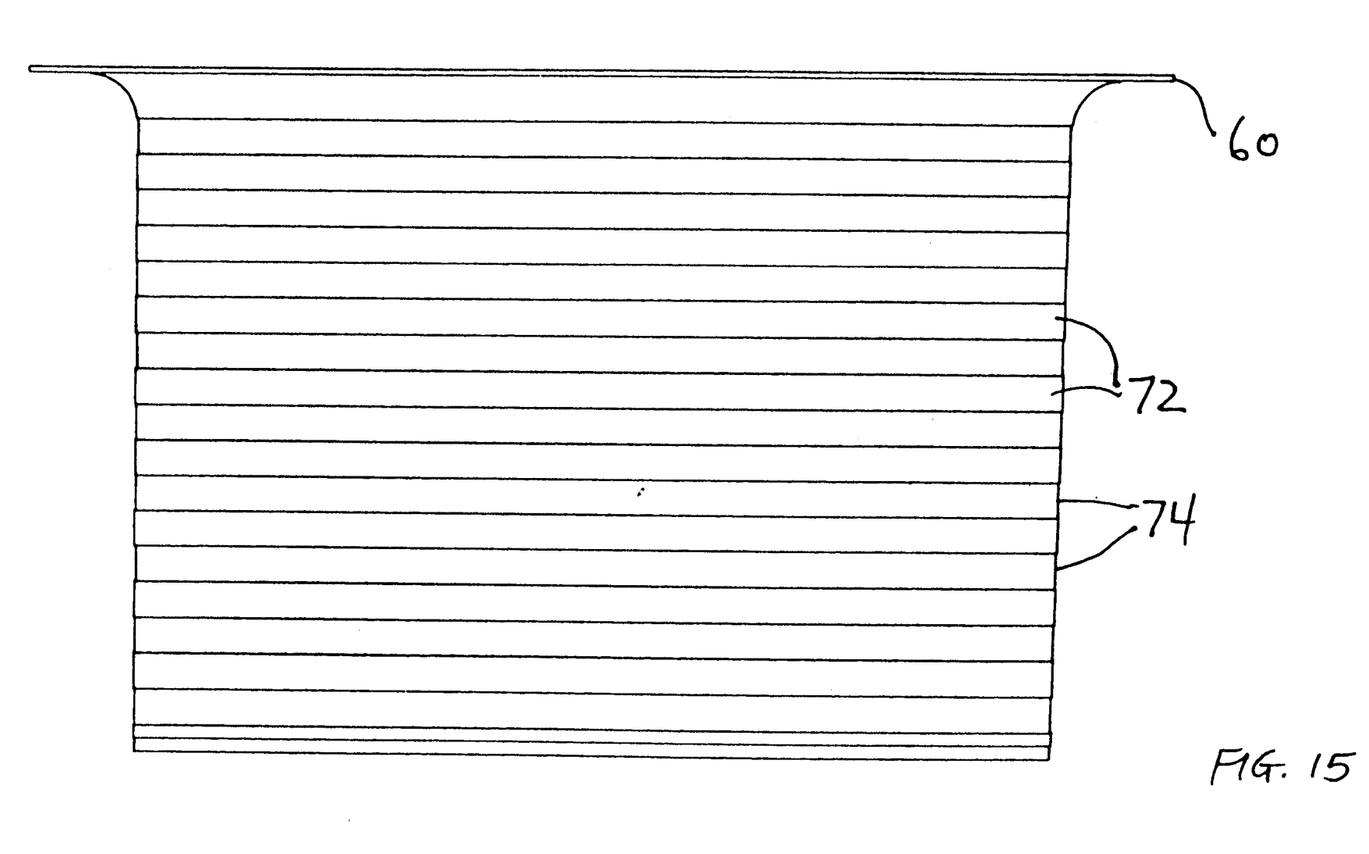

Referring now to FIGS. 14 and 15, there is illustrated yet another embodiment of the present invention wherein the outer surface includes rib portion 70 that is substantially horizontal. Ribs 70 are shown upon a cable protector which has no lip or groove (like FIG. 10), but does include an optional texture on its inside surface 12. Ribs 70 comprise alternating thick wall portions 72 and thin wall portions 74. This embodiment also provides a more uniform curvature of the cable protector as a result of elimination of the tendency to bend along the thin wall portions of vertically oriented ribs. Although the thick and thin wall portions 72 and 74 are shown in an alternating configuration and having about the same width, clearly other configurations are possible.

Figure 16:
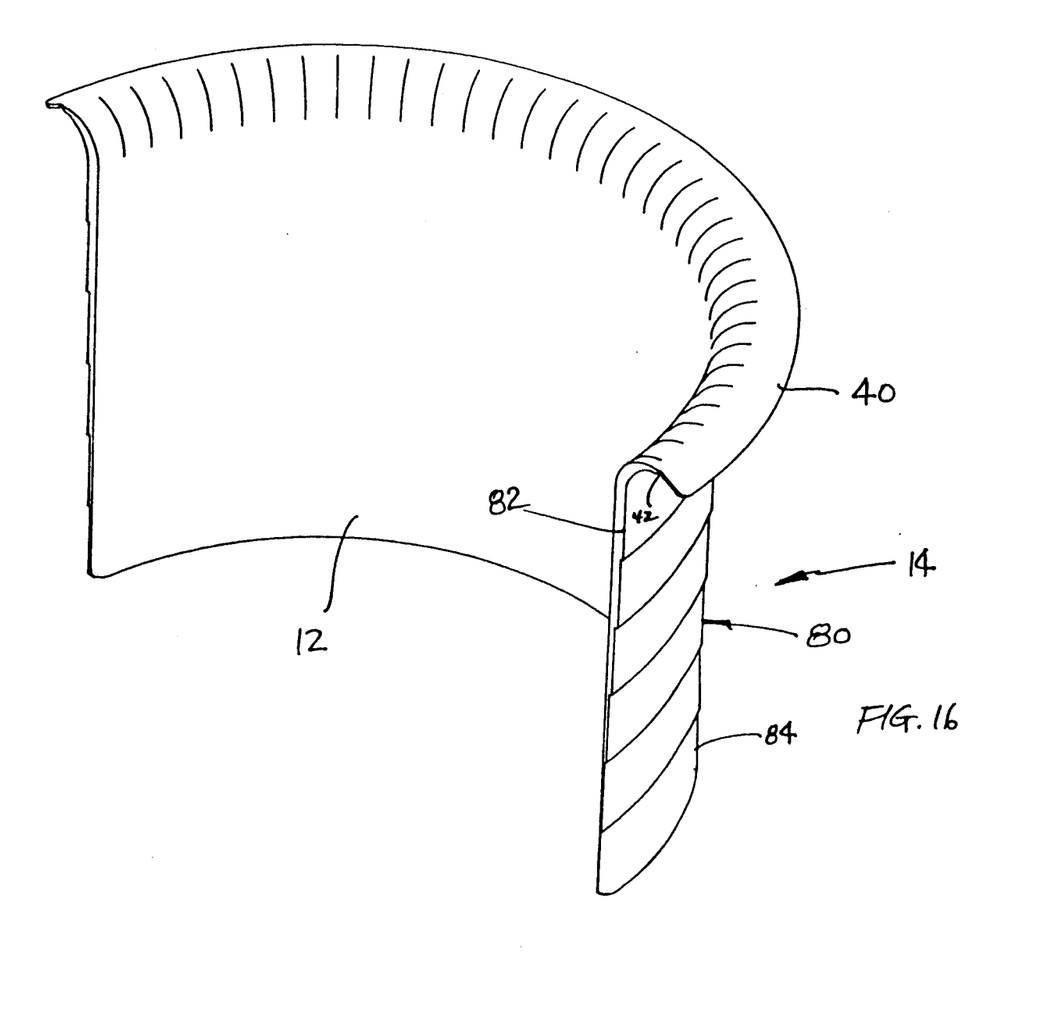
FIGS. 16 and 17 are perspective and side views of yet another alternate embodiment.
Figure 17:
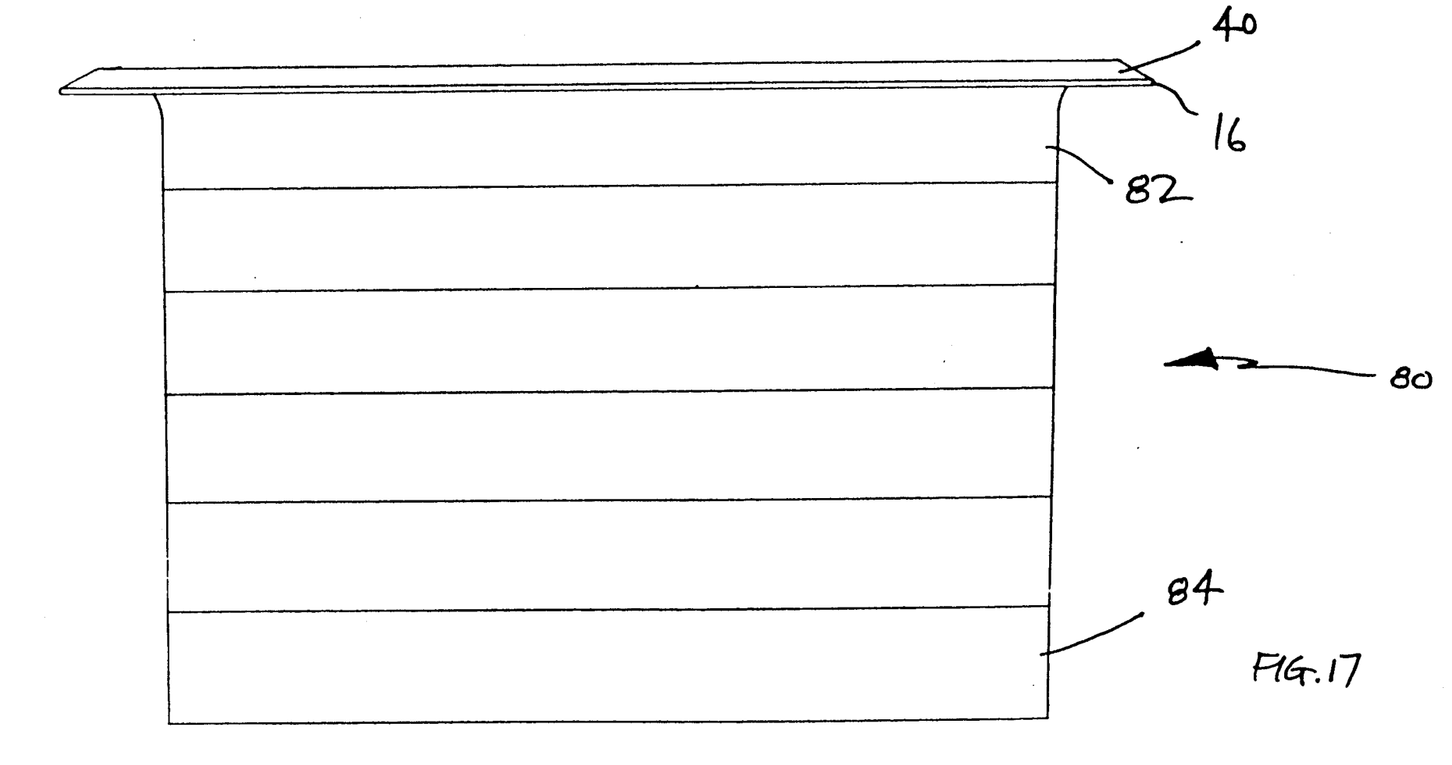

FIGS. 16 and 17 illustrate a still further embodiment of the present invention wherein the outside surface 14 of the cable protector is provided with a "stairstep" type of rib configuration which is indicated generally by reference numeral 80. Ribs 80 are oriented horizontally, and progressively decrease in thickness from the top rib 82 to the bottom rib 84. In other words, top rib 82, which is closest to groove 42 and lip 40, has the thickest wall, while bottom rib 84, positioned farthest away from rib 82, has the thinnest wall. Thick wall rib 82 provides the strongest support for the groove-lip structure and is therefore closest to it. Thin wall rib 84 being farthest away from the groove-lip structure, can be much thinner. Of course, stairstep ribs 80 need not be of equal width, nor do they need extend strictly horizontally. Obviously, numerous modifications and variations of the present invention are possible in light of the above teachings. It is therefore to be understood that within the scope of the appended claims, the invention may be practiced otherwise than as specifically described herein.

We claim as our invention:

1. A cable protector for insertion into a duct or conduit having an open end, said cable protector having a body portion, a lip portion, and a transitional portion between said body portion and said lip portion, said cable protector further being substantially C-shaped in cross-section and including an inside surface and an outside surface, said transitional portion flaring outwardly from said body portion, said lip portion extending outwardly and downwardly from said transitional portion, and a groove located on said outside surface at the junction of said transitional portion and said lip portion.

2. The cable protector of claim 1, wherein said transitional portion extends outwardly in an arch formation between said body portion and said lip portion.

3. The cable protector of claim 2, wherein said inside surface is textured.

4. The cable protector of claim 1, wherein said lip portion folds downwardly and inwardly upon insertion of said cable protector into said duct or conduit.

5. The cable protector of claim 1 wherein said body portion further comprises means for promoting a substantially tubular configuration when said cable protector is placed in said duct or conduit.

6. The cable protector of claim 5, wherein said means for promoting a substantially tubular configuration comprises rib means formed on said curved outside surface.

7. The cable protector of claim 6, wherein said rib means comprise a plurality of elongated protrusions on said outside surface of said body portion.

8. The cable protector of claim 6, wherein said rib means comprises alternating thick wall portions and thin wall portions formed on said curved outer surface of said body portion.

9. The cable protector of claim 8, wherein said alternating thick wall portions and thin wall portions are oriented generally vertically along the longitudinal axis of said body portion.

10. The cable protector of claim 8, wherein said alternating thick wall portions and thin wall portions are oriented generally horizontally to the longitudinal axis of said body portion.

11. The cable protector of claim 9, wherein said rib means extends from one end of said body portion to said groove means.

12. The cable protector of claim 9, wherein said rib means are V-shaped.

13. The cable protector of claim 11, wherein said rib means extends from one end of said body portion to said transitional portion.

14. The cable protector of claim 13, further comprising an interior surface, said interior surface being textured.

15. The cable protector of claim 1 wherein said lip portion is substantially planar.

16. The cable protector of claim 6, wherein said rib means comprises a plurality of bands of varying thickness positioned substantially horizontally on said curved outer surface.

17. The cable protector of claim 16, wherein said bands include a thickest band positioned closes to said lip portion and a thinnest band positioned farthest away from said lip portion.

18. The cable protector of claim 17, wherein said bands are of progressively decreasing wall thickness from said thickest band to said thinnest band.

* * * * *